April 25, 1939. R. PAULY ET AL 2,155,868
DISHWASHING MACHINE
Filed Nov. 8, 1934  2 Sheets-Sheet 1
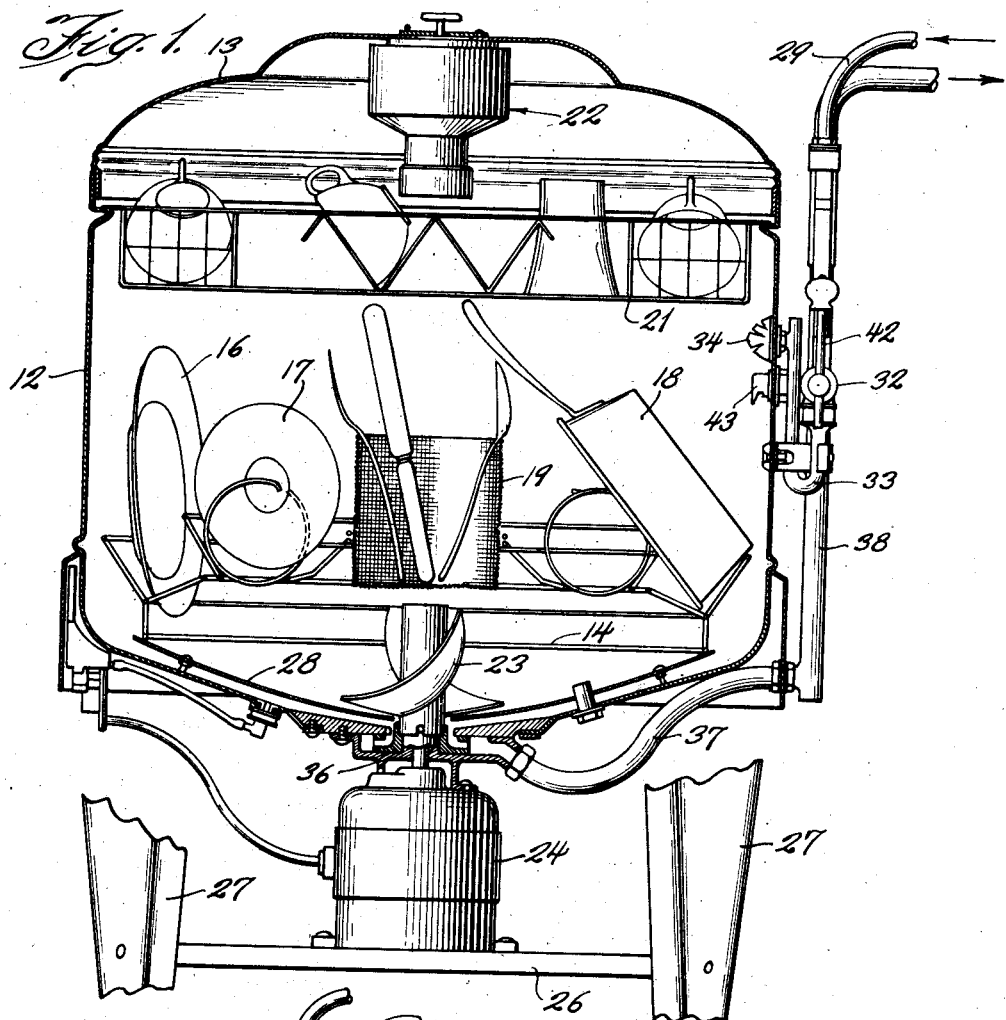
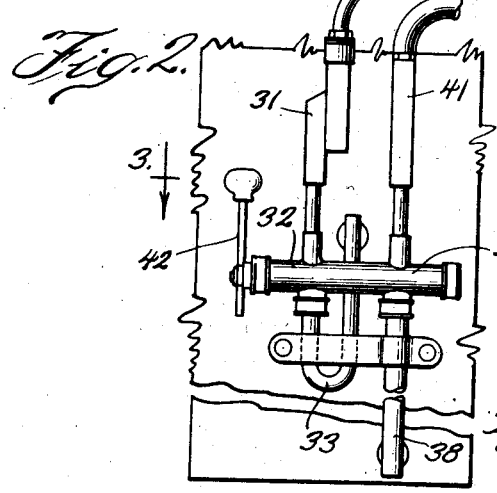
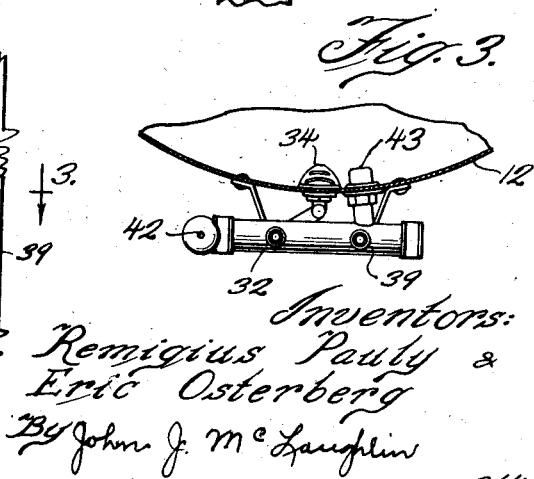
Inventors:
Remigius Pauly &
Eric Osterberg
By John J. McLaughlin
Atty

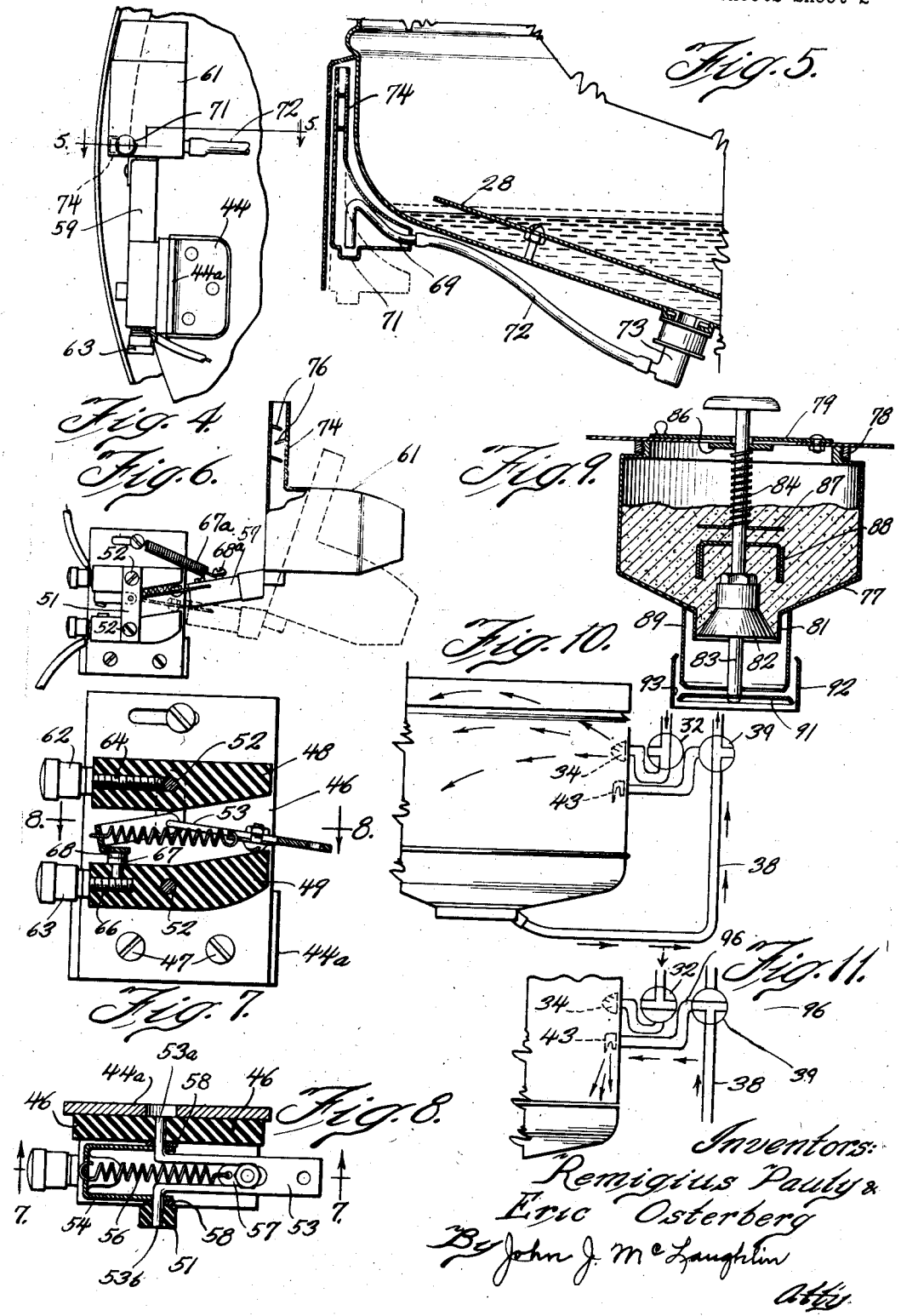

Patented Apr. 25, 1939

2,155,868

UNITED STATES PATENT OFFICE 2,155,868

DISHWASHING MACHINE

Remigius Pauly and Eric Osterberg, Chicago, Ill.

Application November 8, 1934, Serial No. 751,982

8 Claims. (Cl. 141—9)

Our invention relates to dish washing machines. It relates more in particular to an improved water control feature for dish washing machines and the valve mechanism utilized therewith.

The type of dish washer to which the present invention is particularly applicable is that shown in prior Pauly patents numbered 1,884,180; 1,884,181; and 1,939,630. Although the dish washers shown in these patents utilize certain distinctive features and principles, they are typical of the dish washer wherein the dishes are placed upon a suitable rack and water contained in a receptacle housing the rack is moved upwardly in the form of a spray or the like and passes over the dishes to perform a cleansing action. All dish washers of this character possess certain disadvantages from the standpoint of operation, principally that the dish washer requires quite close supervision during a major portion of the time that it is operating. For this reason, the amount of time saved in using a dish washer is not as great as would sometimes be expected, and this failure to save a major proportion of the time ordinarily required to be devoted to the time of washing and drying the dishes results in some considerable limitation in the sale of dish washers. In addition, there are minor objections to the manner in which dish washers are customarily operated known to those skilled in the art or readily understood from a consideration of the improvements which we disclose in our specification.

The principal object of the present invention is the provision of an improved dish washer.

Another object is the provision of improved controls for a dish washer.

Another object is to provide automatic features of control whereby the user of the dish washer is required to make only minor adjustments and to exercise only a limited control during the entire washing and rinsing operations.

Another object is the provision of an improved type of electrical switch for controlling the operation of the motor employed in a dish washer.

Other objects and features of the invention will be apparent from a consideration of the following detailed description taken with the accompanying drawings, wherein Fig. 1 is a fragmentary vertical sectional view partly in elevation showing a dish washer equipped with the features of our invention;

Fig. 2 is a fragmentary elevational view of a portion of the water control mechanism;

Fig. 3 is a plan sectional view taken on the line 3—3 of Fig. 2;

Fig. 4 is a fragmentary view looking upwardly and showing the switch of our invention;

Fig. 5 is a fragmentary transverse sectional view showing a portion of a dish washing machine and switch therefor, in section, the view being taken in part on line 5—5 of Fig. 4;

Fig. 6 is an elevational view of the switch mechanism with an actuated position thereof indicated in dotted lines;

Fig. 7 is a sectional view through a portion of the switch taken on the line 7—7 of Fig. 8;

Fig. 8 is a similar type of view taken on the line 8—8 of Fig. 7;

Fig. 9 is an enlarged vertical sectional view taken through the soap dispensing device shown in elevation in Fig. 1; and Figs. 10 and 11 are schematic views showing the path the water takes at different adjustments of the water control mechanism.

According to the general features of the invention, we provide a dish washer adapted to be operated by the simple means of turning on a faucet and allowing water therefrom to flow into the dish receptacle. The impeller is driven by an electric motor and this motor is automatically controlled by a switch which is actuated in response to the water reaching a predetermined level determined by the setting of the switch. The motor operates a water discharge pump and the pump and water intake are so controlled that as soon as the motor is started, water will be expelled from the container at the same rate of speed that it comes in. Means is provided whereby a valve may be operated to shut off the water intake and to deliver water discharged from the pump back into the container, whereby to avoid power losses which otherwise would be occasioned by closing the discharge side of the pump. A soap dispensing device is provided on the machine for the purpose of feeding a supply of soap into the washing water where it will remain during the time the water is circulating within the dish washer itself. When the dishes have been washed by the wash water, the valve handle is operated again to allow clear water to enter the dish receptacle where it is sprayed over the dishes and gradually settles to the bottom where it is withdrawn by the pump and discharged into a sink or other drainage fixture. The impeller continues to operate with the effect that the water gradually becomes clear and when it is clear the dishes are rinsed and the washing operation is completed.

The automatic motor control switch not only functions to start the motor only when the proper amount of water has been admitted, but when the faucet is shut off and no additional water is admitted to the dish receptacle, the switch allows the motor to continue to operate until substantially all of the water has been removed by the pump, at which time the switch automatically returns to its unactuated or open position and the motor is stopped. In this way, it never becomes necessary for the housewife to operate the motor switch directly.

Referring now to the drawings, the dish washer comprises a receptacle or tub 12 having a removable cover 13, the bottom of the tub being continuous with the side walls thereof. A rack 14 is provided for relatively large and flat dishes such as plates 16, saucers 17 and pans 18, with a center basket 19 for holding silver. An upper basket 21 is provided for holding cups, glasses and similar articles. A soap dispenser 22 which will be described more in detail hereinafter is provided in the upper cover. An impeller 23 is driven by an electric motor 24 carried by a cross brace 26 between legs 27. The tub is provided with a false bottom 28 spaced from the bottom proper by suitable supports, the false bottom being of generally circular shape with an opening near the side walls and an annular opening adjacent the impeller. The arrangement is such that the impeller throws the water upwardly and outwardly and with a swirling motion. The declination of the plates and saucers when placed in their proper position is such that the rotative movement of the water is reversed as it moves upwardly, thereby causing both the fronts and backs of plates or similar dishes to be washed. After the water passes in contact with the dishes in the lower rack, it impinges against the dishes in the upper rack to wash them. The movement of the water throughout is such that it engages against the upper portion of the side walls of the tub, falls downwardly underneath the false bottom, where it is delivered through the annular opening therein to the impeller, again to be thrown upwardly through the same cycle in contact with the dishes.

Water is admitted to the tub or dish receptacle through a pipe 29 adapted to be connected to a usual faucet which furnishes hot water. The pipe 29 contains a pressure regulating valve 31 and this pipe leads to a valve 32, the construction of which will be referred to more in detail hereinafter, the valve being adapted to deliver the water to a pipe 33, whence it is delivered to the inside of the tube through a spray head 34.

A pump indicated generally by the reference character 36 is driven by the motor shaft and water is discharged from the pump through a pipe line 37 to a pipe 38 through a valve 39 and thence through a discharge pipe 41 into the sink or other receptacle for receiving sewage. The pressure regulating valve 31 in the intake line is so designed with respect to the pump 36 that water will be admitted to the tube and discharged therefrom at the same volume rate whereby, while the dish washer is in operation, substantially the same volume of water will be maintained therein. Through a construction which will be described more in detail hereinafter, when the valves 32 and 39 are operated by a single operating handle 42, the intake water is shut off and the water discharged from the pump is delivered back to the tube to a delivery head 43. This water, however, is not sprayed over the dishes in the same way as the clean or feed water.

The switch for controlling the motor operates in response to the water level in the tube and is of a type wherein the water adds to the weight of a supported arm operating an over-center type of switch, but the arrangement being such that water in the tube is substantially all removed by the pump before a sufficient amount of water is removed from its effect upon the switch arm, whereby the switch arm and over-center type of switch will not return to normal until the tub is substantially empty.

Now referring to the switch itself, this includes a support 44 mounted on the bottom of the tub and having a general right angular portion 44a to which a switch frame 46 is secured by means of screws 47. The switch frame 46 is formed of insulating material and includes a pair of frame members 48 and 49 with a cross piece 51. These parts are maintained in assembled relation by screws 52 which extend through the cross piece 51 and the frame portions 48 and 49 and engage into the frame 46. The switch proper is mounted between the frame members 48 and 49.

The switch proper includes a switch arm 53 having a pair of right angular extensions 53a and 53b projecting into the switch frame member 48 and cross piece 51 respectively; and a U-shaped switch arm 54 having the legs of the U rotatably mounted on the extensions 53a and 53b of the arm 53. A tension spring 56 has one end secured to the U-shaped member 54 and the other end secured to a bracket 57 adjustable along the arm 53, whereby the tension of the spring 56 can be regulated. A contact and bearing member 58 is provided between the frame piece 48 and the frame piece 46 and engages the extension 53a of the arm 53. A similar bearing member 58 is provided on the cross piece 51 for the extension 53d.

Secured to the arm 53 is an actuating arm 59 carrying an actuating member generally indicated by the reference character 61, the nature and operation of which will be described more in detail in a subsequent paragraph. In brief, the actuating member 61 is in the form of a water reservoir adapted to increase in weight when water enters it whereby to overcome the tension of spring 56 until the center line of the spring passes the center line of the switch arm fulcrum, after which the tension built up in the spring will cause the switch arms to move past center with a snap after the manner of over-center type of switches.

Electrical features of the switch comprise a pair of binding posts 62 and 63 to which wires leading from the motor 24 and a source of power are attached, whereby to connect said wires to conducting posts 64 and 66 which are threaded into the frame members 48 and 49. In place of threads, they may be held in place by molding the frame members 48 and 49 around them. The screw 64 engages and is connected electrically to the frame assembly screw 52 and thence through the pivot to the bearing member 57 and thence to the middle portions of the switch. The screw 66 has connected thereto a contact member including a contact 67. A co-operating contact 68 is carried by the U-shaped switch arm 54. When the switch is in the position shown in Fig. 7, the contact points are therefore engaged and the switch is closed. In this position, the actuating member 61 is full of water. When the water has been removed in order to return the switch actuating member and the switch arms to unactuated or open position, a spring 67a is provided, one end of which is attached by a screw 68a to the actuating arm 59 and the other end is adjustably secured to the frame member 46.

The actuating member 61 is composed of a hollow body of a shape to fit into a position approximately near the water line at the side of the tub, as indicated in Fig. 5. A small pipe 69 is sealed through the side wall of the hollow body or reservoir, is bent upwardly and then downwardly as shown in Fig. 5, and has its lower opening slightly inserted into a tiny circular sump 71 formed in the bottom of the reservoir. The extending end of the pipe 69 is connected to flexible tubing 72. The flexible tubing is also connected to a drain member 73 communicating with the inside of the tub below the normal water line thereof. Actually, the member 73 is placed at the lowest position in the tub in which it is possible to place it and obtain drainage. The hollow reservoir 61 has an upward extension 74 in the form of a relatively small pipe which contains baffles 76. It is through the small pipe 74 only that the reservoir is in contact with the outer atmosphere. In the operation of the actuating member 61, when the water is caused to enter the tub by turning on the faucet, the flexible tubing 72 and parts connected therewith fill with water at the same time the tub is filled, the water being at the same height. When the water in the tub gradually reaches the desired height, it also flows through the small pipe 69 in the reservoir and rapidly fills such reservoir. This causes the actuating member to drop to the position shown in dotted lines in Fig. 6, thereby actuating the switch. This starts the motor and the discharge pump is then actuated to remove water from the tub at the same speed at which it is entering. If now the faucet is turned off so that water is removed from the tub, the level of the liquid in the reservoir of the switch actuating member 61 drops, but the spring 56 together with the water remaining in the member 61 serves to hold the actuating arm in depressed position until the tub is substantially empty, at which time the action of the spring 67 serves to raise the arm 59 and the member 61, thereby opening the switch contacts and stopping the motor.

We have already described the manner of operating the present dish washer, and how the soap is admitted at any time after all of the water has been admitted and the motor is operated. A suitable soap dispensing device indicated by the general character 22 in Fig. 1 is shown in Fig. 9. Here a soap reservoir 77 is provided for holding powdered soap. This reservoir is open at top and bottom, the top part being screwed at 78 to a member carried by the tub top 13, and a closure member 79 being provided whereby soap may be added to the special reservoir at any time and the cover closed. The bottom of the reservoir is shaped in the form of a restricted tube or cylinder 81 adapted to be closed by a cone type of valve 82 carried on a rod 83. This rod is normally held in an upward position as shown in Fig. 9 by a compression spring 84, one end of which engages a washer 86 carried by the rod 83, and the other end of which engages a cross piece 87 connected to the side walls of the reservoir 77. The rod also carries a closure member 88 which, when the rod 83 is pushed downwardly, closes the bottom opening in the reservoir. This action of pushing the rod down also discharges a portion of the soap into a tubular extension 89 which is partially closed by a generally circular end plate 91 carried by the rod 83. An outer tubular member 92 is secured to the end plate 91 in such a way as to leave a narrow opening 93 of substantially annular shape except where connections are provided. This arrangement permits sprayed water to enter the lower portion of the chamber into which the soap is discharged and wash this soap out while at the same time preventing the water from entering the main soap reservoir.

Figs. 10 and 11 show the general water control features schematically so as to delineate the path which the water takes. Both of these figures carry the same reference characters as the corresponding non-schematic views which they in part illustrate. As shown in Fig. 10, the water is entering and leaving the tub at the same rate, the entering water being sprayed through the head 34 and the returning water being delivered out through the pipe 41 to the sink. The valves 32 and 39 shown schematically indicate the general construction which makes this water path possible. As indicated in Fig. 2, both valves are operated by a single handle 42. In Fig. 11, the two valves are shown moved at right angles to the position shown in Fig. 10. In this position, no fresh water is entering and so no water is flowing through the valve 32. However, the water removed from the bottom of the tub and discharged by the pump is caused to flow through pipe 96 (not appearing in Fig. 1) and thence through the delivery head 43 back into the tub.

The manner in which the various features cooperate together in the operation of the dish washer of our invention is believed readily understood by those skilled in the art from the description of the operation of the various parts. While we describe our invention in detail, we do not limit ourselves to the specific description of the present embodiment nor to a structure in which all of the various features illustrated are combined.

What we claim as new and desire to protect by Letters Patent of the United States is:

1. In a dish washing machine, a tub adapted to contain water and a supply of dishes to be washed, washing mechanism including an impeller positioned within the tub and a motor driving the impeller positioned outside of the tub, a switch for controlling the delivery of current to said motor, and means responsive to the amount of water in the tub to actuate said switch to turn on the motor when a predetermined amount of water is admitted to the tub and to turn off the motor when substantially all of the water has been removed from the tub, said switch actuating means including a switch arm, a hollow body secured to the switch arm, a connection between the hollow body and the interior of the tub whereby said hollow body is filled with water when water rises in the tub and by its increased weight actuates the switch arm and whereby water is drawn off from said body when the water level in the tub falls, and resilient means for moving the switch arm in the opposite direction to that in which it is moved by the weight of water in the hollow body.

2. In a dish washing machine, a tub adapted to contain water and a supply of dishes to be washed, a washing mechanism including an impeller located within the tub and a driving motor therefor located outside of the tub, a switch for controlling the flow of electric current to the motor, a water discharge pump in the bottom of the tub operated when said motor is operated, means for delivering water to the tub at substantially the same speed at which the water is removed therefrom by the pump, a switch arm connected to said switch normally held upwardly by resilient means, a hollow body carried on the arm and connected to the inside of the tub so as to fill with water when a predetermined amount of water is admitted to the tub whereby to depress said switch arm and actuate the switch and start the motor, and means for holding said switch arm in depressed position until substantially all of the water is removed from the tub, whereby said motor will operate to remove water from the tub but said switch will be operated to stop the motor when substantially all of the water has been removed from the tub.

3. A dish washing machine as defined in claim 2, including a valve mechanism for shutting off admission of water to the tub and at the same time for delivering back into the tub water removed therefrom by the pump.

4. A dish washing machine including a tub adapted to hold dishes and a supply of water to wash said dishes and provided with an electric motor for driving washing mechanism, a switch comprising electric switch mechanism having an actuating arm, spring means normally holding said arm upwardly with the switch contacts open, a hollow body carried on the end of said switch arm and having its uppermost position approximately in line with the normal water level in the tub, a flexible pipe connection between the bottom of the tub and said hollow body, a pipe within the hollow body sealed through a lower portion thereof for connection to said flexible connection, said pipe extending upwardly and then downwardly so that its discharge end is near the bottom of the hollow body, the hollow body filling with water causing the switch arm to move downwardly and close the switch contacts, and means for holding said switch arm in its downward position until substantially all of the water has been removed from the dish washing machine at which time said hollow body is then emptied by siphoning of water therefrom, permitting the spring means to return the switch arm to unactuated position and shut off the motor.

5. In a dish washing machine, a tub adapted to contain water and a supply of dishes to be washed, a washing mechanism for cleaning dishes placed within the tub, a pump located near the bottom of the tub for removing water from the tub and connected to operate when the washing mechanism is operated, means for admitting water to the tub to wash the dishes, the admission of water being at the same rate at which water is removed from the tub by the pump when operated, means for causing said washing mechanism and pump to operate in response to the admission of a predetermined amount of water to the tub, and a valve mechanism operable to cut off the supply of incoming water to the tub and direct water removed from the tub by the pump back into the tub whereby soapy water in the tub may be kept in contact with the dishes by the operation of said valve mechanism.

6. A dish washing mechanism as defined in claim 5, including a soap dispensing device mounted in the tub and adapted to be operated to deliver a charge of soap to the tub of approximately the size to soap one charge of water sufficiently for washing purposes.

7. In a dish washing machine, a tub adapted to contain a supply of washing water, a rack for supporting dishes within the tub above the water level therein, an impeller in the tub for projecting water in the tub in contact with the dishes, an electric motor for driving said impeller, means for admitting water to the tub, and means for starting said motor in response to the admission of a predetermined amount of water, said last mentioned means including a movable member whose weight is increased by the admission thereinto of a part of said predetermined amount of water.

8. In a dish washing machine, a tub adapted to contain water and a supply of dishes to be washed, an electrically operated washing mechanism for cleaning dishes placed within the tub, and means for actuating said washing mechanism, said actuating means operating in response to the admission of a predetermined amount of water into the tub, said actuating means including a movable member whose weight is increased by the admission thereinto of a part of said predetermined amount of water.

REMIGIUS PAULY.
ERIC OSTERBERG.